United States Patent
Imai et al.

(10) Patent No.: US 9,083,965 B2
(45) Date of Patent: Jul. 14, 2015

(54) STEREOSCOPIC DISPLAY DEVICE

(75) Inventors: Masahiro Imai, Osaka (JP); Noriyuki Nakane, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 420 days.

(21) Appl. No.: 13/254,028

(22) PCT Filed: Apr. 16, 2010

(86) PCT No.: PCT/JP2010/056845
§ 371 (c)(1),
(2), (4) Date: Aug. 31, 2011

(87) PCT Pub. No.: WO2010/134409
PCT Pub. Date: Nov. 25, 2010

(65) Prior Publication Data
US 2011/0316989 A1    Dec. 29, 2011

(30) Foreign Application Priority Data

May 22, 2009   (JP) .................................. 2009-124753

(51) Int. Cl.
*H04N 13/04*       (2006.01)
*H04N 9/47*        (2006.01)
(Continued)

(52) U.S. Cl.
CPC ........ *H04N 13/0411* (2013.01); *G02B 27/2214* (2013.01); *G02B 27/2264* (2013.01); *G09G 3/004* (2013.01); *G09G 3/2018* (2013.01); *H04N 13/0422* (2013.01); *H04N 13/0452* (2013.01); *H04N 13/0497* (2013.01);
(Continued)

(58) Field of Classification Search
None
See application file for complete search history.

(56) References Cited

U.S. PATENT DOCUMENTS

| 5,493,427 A | 2/1996 | Nomura et al. |
| 5,670,970 A | 9/1997 | Yamazaki |

(Continued)

FOREIGN PATENT DOCUMENTS

| JP | 7-75135 | 3/1995 |
| JP | 2005-258013 | 3/1995 |

(Continued)

OTHER PUBLICATIONS

International Search Report for PCT/JP2010/056845, mailed Jul. 13, 2010.
(Continued)

*Primary Examiner* — Joseph Ustaris
*Assistant Examiner* — Rebecca Volentine
(74) *Attorney, Agent, or Firm* — Nixon & Vanderhye P.C.

(57) ABSTRACT

Provided is a liquid crystal display device 10 that divides "3m" video signal lines into groups of three lines according to an order of arrangement, and drives the video signal lines in the group within one horizontal period in a time-division manner. A pixel array 17 is configured such that columns each including pixel circuits for left eye 21 arranged along a vertical direction of a display screen and columns each including pixel circuits for right eye 22 arranged along the vertical direction of the display screen are arranged along a horizontal direction of the display screen. When driving the video signal lines in a time-division manner, a writing order to pixel circuits 18 within one horizontal period and a polarity of a voltage to be applied to the pixel circuits 18 are changed every two scanning signal lines. This improves image quality of both an image for left eye and an image for right eye, thereby improving image quality in stereoscopic display.

6 Claims, 10 Drawing Sheets

(51) Int. Cl.
- *G02B 27/22* (2006.01)
- *G09G 3/36* (2006.01)
- *G09G 3/00* (2006.01)
- *G09G 3/20* (2006.01)
- *G02F 1/1345* (2006.01)
- *G02F 1/1347* (2006.01)

(52) U.S. Cl.
CPC .......... *G02F 1/1347* (2013.01); *G02F 1/13454* (2013.01); *G02F 2203/12* (2013.01); *G09G 3/3614* (2013.01); *G09G 2310/0218* (2013.01)

(56) References Cited

U.S. PATENT DOCUMENTS

| | | | |
|---|---|---|---|
| 6,342,876 B1* | 1/2002 | Kim | 345/87 |
| 7,808,493 B2* | 10/2010 | Hashimoto et al. | 345/204 |
| 8,154,543 B2* | 4/2012 | Song et al. | 345/419 |
| 2003/0011583 A1* | 1/2003 | Yamazaki | 345/204 |
| 2005/0104801 A1* | 5/2005 | Sugiura | 345/5 |
| 2006/0007213 A1* | 1/2006 | Hashimoto et al. | 345/204 |
| 2006/0012593 A1* | 1/2006 | Iriguchi et al. | 345/204 |
| 2007/0268233 A1 | 11/2007 | Hashimoto et al. | |
| 2008/0079703 A1 | 4/2008 | Yamagami | |
| 2008/0100599 A1* | 5/2008 | Kinoshita | 345/204 |
| 2008/0180378 A1* | 7/2008 | Tang | 345/96 |
| 2008/0316596 A1* | 12/2008 | Cha et al. | 359/463 |
| 2009/0096726 A1* | 4/2009 | Uehara et al. | 345/84 |
| 2009/0096943 A1* | 4/2009 | Uehara et al. | 349/37 |
| 2009/0179879 A1* | 7/2009 | Nozawa | 345/204 |
| 2009/0244387 A1* | 10/2009 | Lee et al. | 348/674 |
| 2009/0322666 A1* | 12/2009 | Hsu | 345/96 |

FOREIGN PATENT DOCUMENTS

| | | |
|---|---|---|
| JP | 7-175448 | 7/1995 |
| JP | 2003-58119 | 2/2003 |
| JP | 2004-37498 | 2/2004 |
| JP | 2008-89649 | 4/2008 |
| JP | 2008-268421 | 11/2008 |

OTHER PUBLICATIONS

Non-English International Preliminary Report on Patentability for PCT/JP2010/056845, mailed Jul. 2, 2010.

* cited by examiner

Fig. 6

|  | ODD-NUMBERED FRAME | EVEN-NUMBERED FRAME |
|---|---|---|
| FIRST GROUP (PIXEL FOR LEFT EYE) | FORWARD ORDER (R→G→B) POSITIVE POLARIRY VOLTAGE | REVERSE ORDER (B→G→R) NEGATIVE POLARIRY VOLTAGE |
| SECOND GROUP (PIXEL FOR RIGHT EYE) | FORWARD ORDER (R→G→B) POSITIVE POLARIRY VOLTAGE | REVERSE ORDER (B→G→R) NEGATIVE POLARIRY VOLTAGE |
| THIRD GROUP (PIXEL FOR LEFT EYE) | REVERSE ORDER (B→G→R) NEGATIVE POLARIRY VOLTAGE | FORWARD ORDER (R→G→B) POSITIVE POLARIRY VOLTAGE |
| FORTH GROUP (PIXEL FOR RIGHT EYE) | REVERSE ORDER (B→G→R) NEGATIVE POLARIRY VOLTAGE | FORWARD ORDER (R→G→B) POSITIVE POLARIRY VOLTAGE |

Fig. 9

| | ODD-NUMBERED FRAME | EVEN-NUMBERED FRAME |
|---|---|---|
| FIRST GROUP (PIXEL FOR LEFT EYE) | FORWARD ORDER (R→G→B) POSITIVE POLARIRY VOLTAGE | REVERSE ORDER (B→G→R) NEGATIVE POLARIRY VOLTAGE |
| SECOND GROUP (PIXEL FOR RIGHT EYE) | FORWARD ORDER (R→G→B) NEGATIVE POLARIRY VOLTAGE | REVERSE ORDER (B→G→R) POSITIVE POLARIRY VOLTAGE |
| THIRD GROUP (PIXEL FOR LEFT EYE) | REVERSE ORDER (B→G→R) POSITIVE POLARIRY VOLTAGE | FORWARD ORDER (R→G→B) NEGATIVE POLARIRY VOLTAGE |
| FORTH GROUP (PIXEL FOR RIGHT EYE) | REVERSE ORDER (B→G→R) NEGATIVE POLARIRY VOLTAGE | FORWARD ORDER (R→G→B) POSITIVE POLARIRY VOLTAGE |

STEREOSCOPIC DISPLAY DEVICE

This application is the U.S. national phase of International Application No. PCT/JP2010/56845 filed 16 Apr. 2010 which designated the U.S. and claims priority to JP Patent Application No. 2009-124753 filed 22 May 2009, the entire contents of each of which are hereby incorporated by reference.

TECHNICAL FIELD

The present invention relates to display devices, and in particular, to a stereoscopic display device having a function of displaying an image in a stereoscopic manner.

BACKGROUND ART

There have conventionally been known stereoscopic display devices having a function of displaying an image in a stereoscopic manner. A stereoscopic display device includes pixels for left eye and pixels for right eye and displays different images respectively by the two types of pixels. Because there is parallax between human eyes, it is possible to make a person recognize an image in a stereoscopic manner by displaying images suitable for left eye and right eye.

As a method of performing stereoscopic display, a method using a lenticular lens and a method using a parallax barrier are widely known. While the former method only performs stereoscopic display, the latter method is able to switch between stereoscopic display and normal flat display by controlling on and off of a parallax barrier. A stereoscopic display device using a lenticular lens is described in Patent Document 1, for example. A stereoscopic display device using a parallax barrier is described in Patent Document 2, for example.

A stereoscopic display device is configured using, for example, a liquid crystal display device. A liquid crystal display device performs polarity inversion drive in which a polarity of a voltage applied to liquid crystals is changed at regular intervals, in order to prevent deterioration of liquid crystals due to continuous application of a voltage having the same polarity. Examples of polarity inversion drive include frame inversion drive in which a polarity of the voltage applied to the liquid crystals is changed each frame, line inversion drive in which the polarity is changed each line, and dot inversion drive in which the polarity is changed each pixel or each sub-pixel, or the like. Of these, the frame inversion drive is the least difficult to realize, but has a problem that flickers (flickering) occur in a displayed image. Accordingly, in an actual liquid crystal display device, the line inversion drive or the dot inversion drive is performed in order to improve image quality.

A liquid crystal panel included in a liquid crystal display device is provided with video signal lines of a number according to resolution of a display screen. In recent years, the number of video signal lines has increased along with increasing definition of a display screen, and thus it becomes necessary to arrange signal lines for connecting a drive circuit with video signal lines on a liquid crystal panel at a narrow pitch. Accordingly, there has conventionally been known a method of dividing video signal lines into groups of "a" lines ("a" is an integer not smaller than 2) according to an order of arrangement, assigning output terminals of a video signal line drive circuit one by one to the groups, and driving video signal lines in a single group within one horizontal period in a time-division manner (hereinafter referred to as video signal line time-division drive). In a display device that performs video signal line time-division drive, an analog switch is provided, between the video signal line drive circuit and each video signal line, for switching between video signal lines to which a signal voltage outputted from the video signal line drive circuit is applied. With this, the number of the signal lines connecting the video signal line drive circuit and the video signal lines can be reduced to one "a"-th. The liquid crystal display device performing video signal line time-division drive is described in Patent Document 3, for example.

PRIOR ART DOCUMENTS

Patent Documents

[Patent Document 1] Japanese Laid-Open Patent Publication No. 7-75135
[Patent Document 2] Japanese Laid-Open Patent Publication No. 2005-258013
[Patent Document 3] Japanese Laid-Open Patent Publication No. 2003-58119

SUMMARY OF THE INVENTION

Problems to be Solved by the Invention

In a stereoscopic display device, pixels for left eye and pixels for right eye are arranged along a horizontal direction of a display screen. In a pixel arrangement shown in FIG. 11, columns each having pixel circuits for left eye 91 arranged along a vertical direction of the display screen and columns each having pixel circuits for right eye 92 arranged along the vertical direction of the display screen are alternately arranged along the horizontal direction of the display screen. A liquid crystal display device that performs stereoscopic display also performs polarity inversion drive and video signal line time-division drive, similarly to a liquid crystal display device that performs flat display.

However, applying a method of driving the liquid crystal display device that performs flat display directly to the liquid crystal display device performing stereoscopic display results in a problem of deterioration of image quality. It is assumed that, in FIG. 11, for example, the pixel circuits for left eye 91 and the pixel circuits for right eye 92 are both arranged along a direction in which scanning signal lines extend. When the liquid crystal display device performs single line inversion drive that is widely employed in the liquid crystal display devices that perform flat display, a polarity of a voltage applied to liquid crystals is changed as shown in FIG. 12. Here, focusing on the pixel circuits for left eye 91, positive polarity voltages are applied to all of the pixel circuits for left eye 91 at an odd-numbered frame, and negative polarity voltages are applied to all of the pixel circuits for left eye 91 at an even-numbered frame. As described above, nothing but the frame inversion drive is performed for the pixels for left eye. This also applies to the pixels for right eye.

As described above, performing single line inversion drive to the liquid crystal display device having the pixel arrangement shown in FIG. 11 only results in performing frame inversion drive to both the pixels for left eye and the pixels for right eye, and therefore flickers occur in a displayed image. Such flickers become more noticeable in a case in which an image for left eye is a black image and an image for right eye is a monochromatic halftone image in a color other than black, for example. Therefore, special contrivance is required to a method of driving a liquid crystal display device that performs stereoscopic display.

Thus, an object of the present invention is to provide a stereoscopic display device with high image quality capable of driving in a manner suitable for stereoscopic display.

Means for Solving the Problems

According to a first aspect of the present invention, there is provided a stereoscopic display device having a function of displaying an image in a stereoscopic manner, the stereoscopic display device including: a plurality of scanning signal lines that extend along a vertical direction of a display screen; a plurality of video signal lines that extend along a horizontal direction of the display screen, and are classified into groups of a predetermined number of lines according to an order of arrangement; a pixel array that includes a plurality of pixel circuits arranged corresponding to intersections between the scanning signal lines and the video signal lines; a scanning signal line drive circuit configured to select the scanning signal lines; a video signal line drive circuit configured to output, to each group of the video signal lines, a voltage to be applied to the video signal lines in the group in a time-division manner within one horizontal period; and a video signal line selection circuit configured to select one of the video signal lines in each group, and supply the voltage outputted from the video signal line drive circuit to the selected video signal line, wherein the pixel array is configured such that columns each having pixel circuits for left eye arranged along the vertical direction of the display screen and columns each having pixel circuits for right eye arranged along the vertical direction of the display screen are arranged along the horizontal direction of the display screen, and an order of writing to the pixel circuits within one horizontal period changes every multiples of two scanning signal lines.

According to a second aspect of the present invention, in the first aspect of the present invention, the pixel array is configured such that the columns of the pixel circuits for left eye and the columns of the pixel circuits for right eye are alternately arranged along the horizontal direction of the display screen, and the order of writing is changed every two scanning signal lines.

According to a third aspect of the present invention, in the second aspect of the present invention, when an image is displayed in a flat manner, the order of writing is changed every single scanning signal line.

According to a fourth aspect of the present invention, in the second aspect of the present invention, a polarity of a voltage to be written to the pixel circuits is changed every two scanning signal lines.

According to a fifth aspect of the present invention, in the fourth, aspect of the present invention, the polarity of the voltage is changed every four scanning signal lines that are arranged next to each other in each frame in four different manners.

According to a sixth aspect of the present invention, in the fourth aspect of the present invention, when an image is displayed in a flat manner, the polarity of the voltage is changed every single scanning signal line.

According to a seventh aspect of the present invention, there is provided a method of driving a stereoscopic display device including: a plurality of scanning signal lines that extend along a vertical direction of a display screen; a plurality of video signal lines that extend along a horizontal direction of the display screen, and are classified into groups of a predetermined number of lines according to an order of arrangement; and a pixel array that includes a plurality of pixel circuits arranged corresponding to intersections between the scanning signal lines and the video signal lines, the method including the steps of: selecting the scanning signal lines; outputting, to each group of the video signal lines, a voltage be applied to the video signal lines in the group in a time-division manner within one horizontal period; and selecting one of the video signal lines in each group, and supplying the voltage outputted in a time-division manner to the selected video signal line, wherein the pixel array is configured such that columns each including pixel circuits for left eye arranged along the vertical direction of the display screen and columns each including pixel circuits for right eye arranged along the vertical direction of the display screen are arranged along the horizontal direction of the display screen, and an order of writing to the pixel circuits within one horizontal period is changed every multiples of two scanning signal lines.

Effect of the Invention

According to the first or seventh aspect of the present invention, by changing the order of writing to the pixel circuits within one horizontal period every multiples of two scanning signal lines, it is possible to improve image quality of both the image for left eye and the image for right eye, thereby improving image quality in stereoscopic display.

According to the second aspect of the present invention, by changing the order of writing to the pixel circuits within one horizontal period every two scanning signal lines, it is possible to improve image quality of both the image for left eye and the image for right eye, thereby improving image quality in stereoscopic display.

According to the third aspect of the present invention, by changing the order of writing to the pixel circuits within one horizontal period every two scanning signal lines in stereoscopic display, and every single scanning signal line in flat display, it is possible to improve image quality in either display mode.

According to the fourth aspect of the present invention, by changing the polarity of the voltage to be written to the pixel circuits every two scanning signal lines, it is possible to improve image quality of both the image for left eye and the image for right eye, thereby improving image quality in stereoscopic display.

According to the fifth aspect of the present invention, by changing the polarity of the voltage to be written to the pixel circuits every four signal lines that are arranged next to each other in each frame in four different manners, it is possible to make, for all the video signal lines, a probability that a signal voltage of the same polarity is written next and a probability that a signal voltage of a different polarity is written next to be the same. With this, it is possible to suppress a luminance difference between the image for left eye and the image for right eye.

According to the sixth aspect of the present invention, by changing the polarity of the voltage to be written to the pixel circuits every two scanning signal lines in stereoscopic display, and every single scanning signal line in flat display, it is possible to improve image quality in either display mode.

BRIEF DESCRIPTION OF THE DRAWINGS

FIG. 6 is likewise a table showing writing orders and voltage polarities in stereoscopic display.

FIG. 9 is a table showing writing orders and voltage polarities in a driving method according to a comparative example.

MODE FOR CARRYING OUT THE INVENTION

First Embodiment

Figure 1:
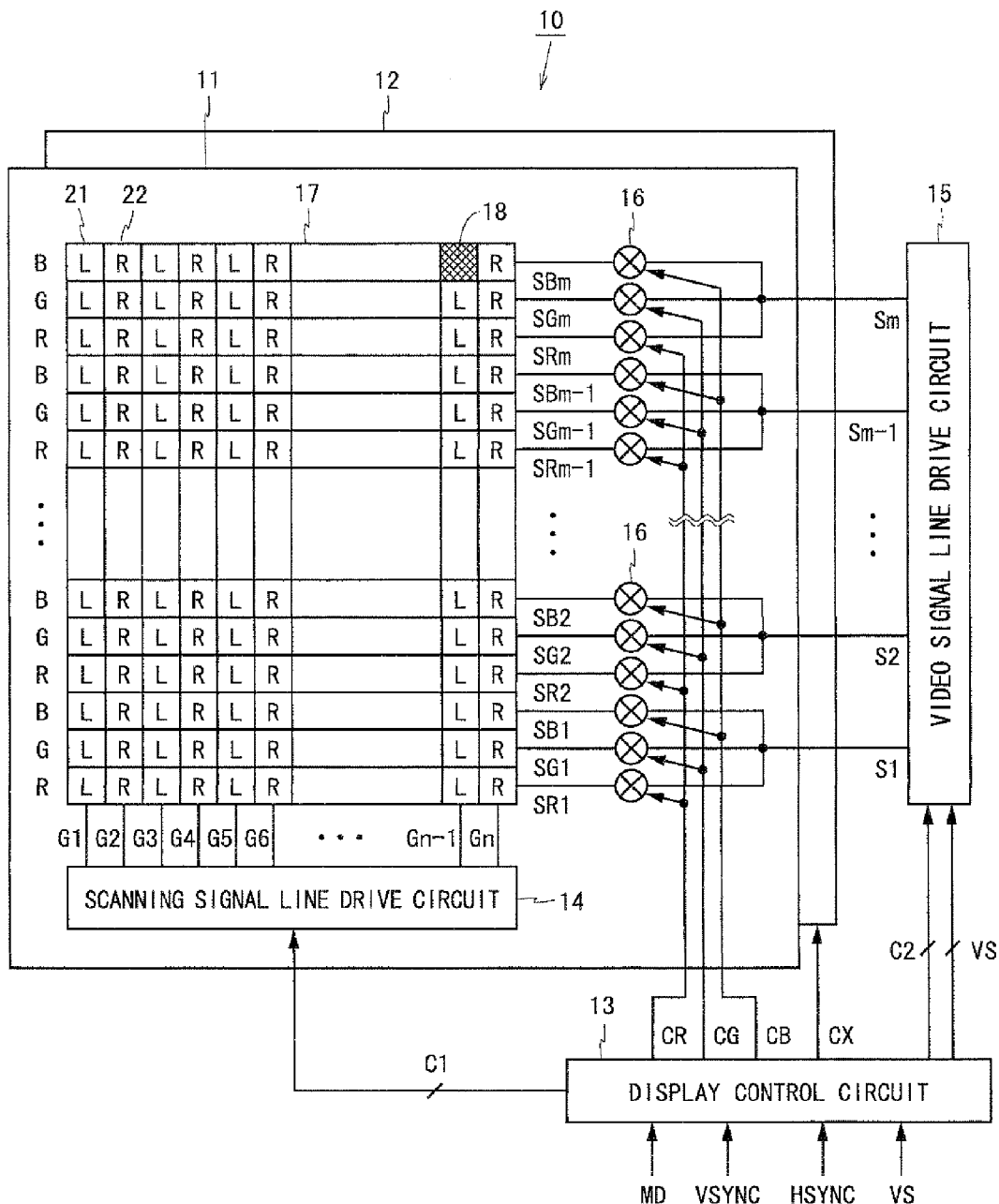
FIG. 1 is a block diagram illustrating a configuration of a liquid crystal display device according to a first embodiment of the present invention.

FIG. 1 is a block diagram illustrating a configuration of a liquid crystal display device according to a first embodiment of the present invention. A liquid crystal display device 10 shown in FIG. 1 includes a display liquid crystal panel 11, a parallax barrier liquid crystal panel 12, a display control circuit 13, a scanning signal line drive circuit 14, a video signal line drive circuit 15, and a backlight (not illustrated). The display liquid crystal panel 11 includes a plurality of analog switches 16 and a pixel array 17. The scanning signal line drive circuit 14 is provided monolithically with the display liquid crystal panel 11. The liquid crystal display device 10 selectively performs flat display and stereoscopic display using a parallax barrier. Further, the liquid crystal display device 10 performs polarity inversion drive and video signal line time-division drive.

The display liquid crystal panel 11 is an active matrix-type TFT (Thin Film Transistor) liquid crystal panel. The display liquid crystal panel 11 includes "n" scanning signal lines G1 to Gn, "3m" video signal lines SR1 to SRm, SG1 to SGm, and SB1 to SBm, and (3m×n) pixel circuits 18 (where, m and n are integers not smaller than 2). The "n" scanning signal lines are arranged in parallel with each other. The "3m" video signal lines are arranged in parallel with each other and perpendicular to the scanning signal lines. The scanning signal lines extend along a vertical direction of a display screen, and the video signal lines extend along a horizontal direction of the display screen. The pixel circuits 18 are arranged respectively corresponding to intersections between the scanning signal lines and the video signal lines, and connected to the corresponding ones of the scanning signal lines and the video signal lines.

The pixel circuits 18 are classified, into R pixel circuits for displaying red, G pixel circuits for displaying green, and B pixel circuits for displaying blue. The pixel circuits 18 of the three types are connected to the video signal lines respectively according to the type. For example, to the video signal line SR1, "n" R pixel circuits are connected. The three pixel circuits 18 that are arranged along a direction in which the scanning signal lines extend constitute a single pixel. The display liquid crystal panel 11 includes (m×n) pixels.

The pixel circuits 18 are also classified into pixel circuits for left eye 21 for displaying an image for left eye, and pixel circuits for right eye 22 for displaying an image for right eye. As shown in FIG. 1, the pixel array 17 is configured such that columns each having the pixel circuits for left eye 21 arranged along the vertical direction of the display screen and columns each having the pixel circuits for right eye 22 arranged along the vertical direction of the display screen are alternately arranged along the horizontal direction of the display screen. In an odd-numbered column, the pixel circuits for left eye 21 are arranged, and in an even-numbered column, the pixel circuits for right eye 22 are arranged. The three pixel circuits for left eye 21 that are arranged along the direction in which the scanning signal lines extend constitute a single pixel for left eye. Likewise, the three pixel circuits for right eye 22 that are arranged along the direction in which the scanning signal lines extend constitute a single pixel for right eye.

The video signal line drive circuit 15 includes "m" output terminals S1 to Sm. The "3m" video signal lines are divided into "m" groups each including three lines according to an order of arrangement, and the groups are respectively associated with the output terminals of the video signal line drive circuit 15. The display liquid crystal panel 11 is provided with the "3m" analog switches 16 in association with the "3m" video signal lines. One end of each analog switch 16 is connected to one of the video signal lines, and the other end is connected to one of the output terminals of the video signal line drive circuit 15 corresponding to the group to which the relevant video signal line is included.

The display control circuit 13 is supplied with control signals such as a vertical synchronizing signal VSYNC and a horizontal synchronizing signal HSYNC as well as with a video signal VS from outside the liquid crystal display device 10. In addition, the display control circuit 13 is supplied with a mode selection signal MD for switching between flat display and stereoscopic display. Based on these signals, the display control circuit 13 outputs a control signal C1 to the scanning signal line drive circuit 14, a control signal C2 and the video signal VS to the video signal line drive circuit 15, and switch control signals CR, CG, and CB to the analog switches 16. The switch control signal CR is supplied to the analog switches 16 connected to the video signal lines SR1 to SRm, the switch control signal CG is supplied to the analog switches 16 connected to the video signal lines SG1 to SGm, and the switch control signal CB is supplied to the analog switches 16 connected to the video signal lines SB1 to SBm.

The scanning signal line drive circuit 14 drives the "n" scanning signal lines based on the control signal C1. More specifically, based on the control signal C1, the scanning signal line drive circuit 14 selects one of the "n" scanning signal lines according to the order of arrangement, applies a selection voltage (high-level voltage, for example) to the selected scanning signal line. With this, the "3m" pixel circuits 18 that are connected to the selected scanning signal line are collectively selected.

The video signal line drive circuit 15 drives the "3m" video signal lines based on the control signal C2 and the video signal VS. More specifically, the video signal line drive circuit 15 divides one horizontal period into three periods (hereinafter referred to as first to third periods), and outputs "m" signal voltages, corresponding to the video signal VS, from the "m" output terminals S1 to Sm in the respective periods. Each analog switch 16 is turned to an ON state when the supplied switch control signal is high-level, and turned, to an OFF state when this switch control signal is low-level. For example, when the switch control signal CR is high-level, the "m" analog switches 16 connected to the video signal lines SR1 to SRm are turned to the ON state, and the "m" signal voltages outputted from the video signal line drive circuit 15 are applied to the video signal lines SR1 to SRm. In this manner, the analog switches 16 function as a video signal line selection circuit configured to select a single video signal line from each group, and supplies the selected video signal line with a voltage outputted from the video signal line drive circuit 15.

The switch control signals CR, CC, and CB become high-level in one of the first to third periods within one horizontal period according to an order that will be described later. With this, each of the "3m" video signal lines are applied with a signal voltage for one time within one horizontal period, and the signal voltages applied to the video signal lines are written to the "3m" pixel circuits 18 that are selected using the scanning signal line. By performing the above operation for "n" times within one vertical period (one frame period), an image according to the video signal VS is displayed in the display liquid crystal panel 11.

Figure 2:
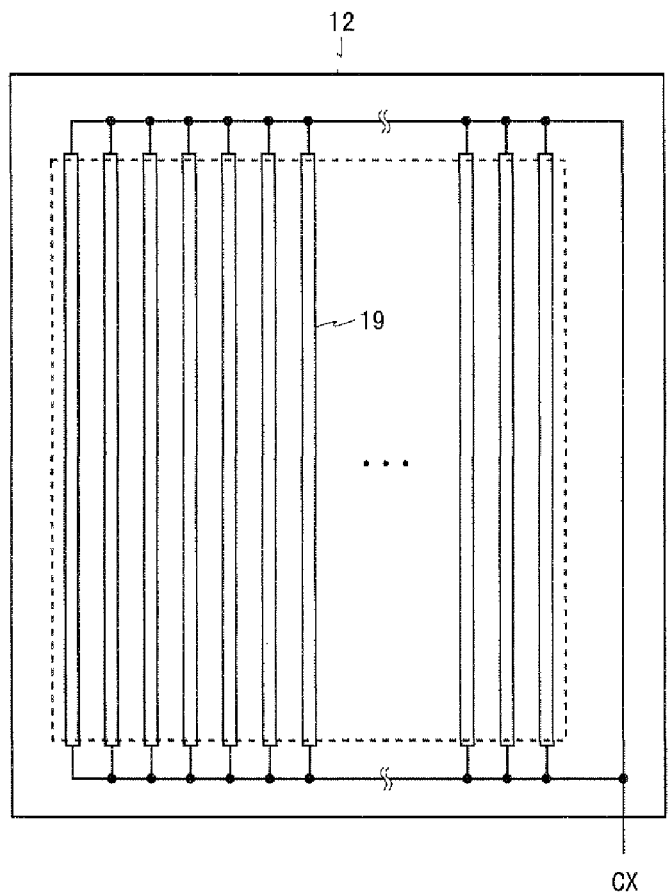
FIG. 2 is a diagram illustrating a configuration of a parallax barrier liquid crystal panel included in the liquid crystal display device shown in FIG. 1.

The parallax barrier liquid crystal panel 12 is a liquid crystal panel of a TN (Twisted Nematic) type. FIG. 2 is a diagram illustrating a configuration of the parallax barrier liquid crystal panel 12. As shown in FIG. 2, the parallax barrier liquid crystal panel 12 is provided with a plurality of shutter areas 19 elongated along the vertical direction of the display screen. The shutter areas 19 take one of a transparent state and a nontransparent state according to a control signal CX outputted from the display control circuit 13. In the following description, it is assumed that the shutter areas 19 take the transparent state when the control signal CX is low-level, and take the nontransparent state when the control signal CX is high-level. The parallax barrier liquid crystal panel 12 is provided on a back side of the display liquid crystal panel 11. A backlight is provided on a back side of the parallax barrier liquid crystal panel 12.

The liquid crystal display device 10, according to the mode selection signal MD, selectively performs flat display in which an image is displayed in a flat manner, and stereoscopic display in which an image is displayed in a stereoscopic manner. In order to perform stereoscopic display, it is necessary to display an image for left eye using the pixel circuits for left eye 21 and to display an image for right eye using the pixel circuits for right eye 22. The image for left eye and the image for right eye are generated within the display control circuit 13 or outside the liquid crystal display device 10.

Figure 3:
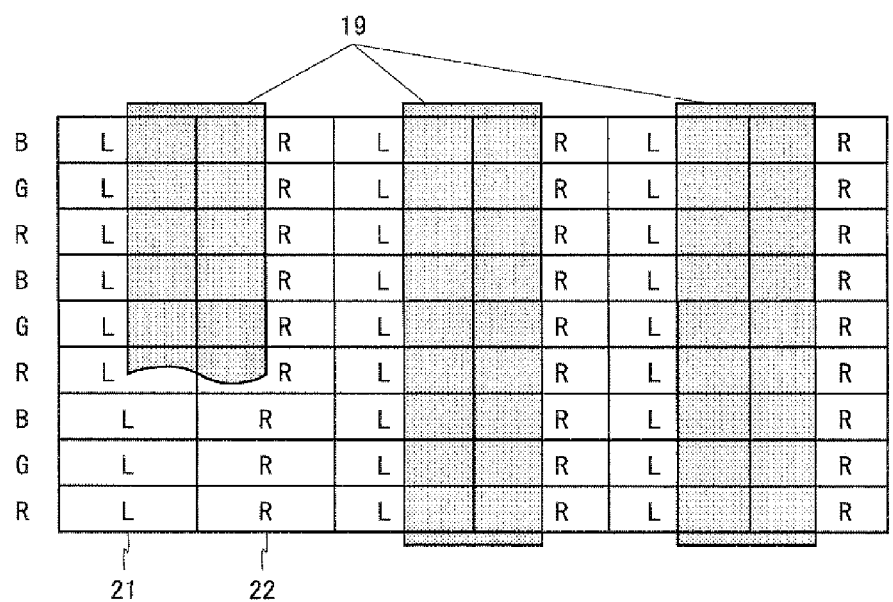
FIG. 3 is a diagram illustrating, in an overlapping manner, pixel circuits of a display liquid crystal panel and shutter areas of the parallax barrier liquid crystal panel included in the liquid crystal display device shown in FIG. 1.

FIG. 3 is a diagram illustrating, in an overlapping manner, the pixel circuits 18 of the display liquid crystal panel 11 and the shutter areas 19 of the parallax barrier liquid crystal panel 12. As shown in FIG. 3, a width of the shutter areas 19 is substantially the same as a size of the pixel circuits 18 along a direction in which the video signal lines extend. The shutter areas 19 are arranged so as to overlap with a right half of the pixel circuits for left eye 21 and a left half of the pixel circuits for right eye 22.

Figure 4A:
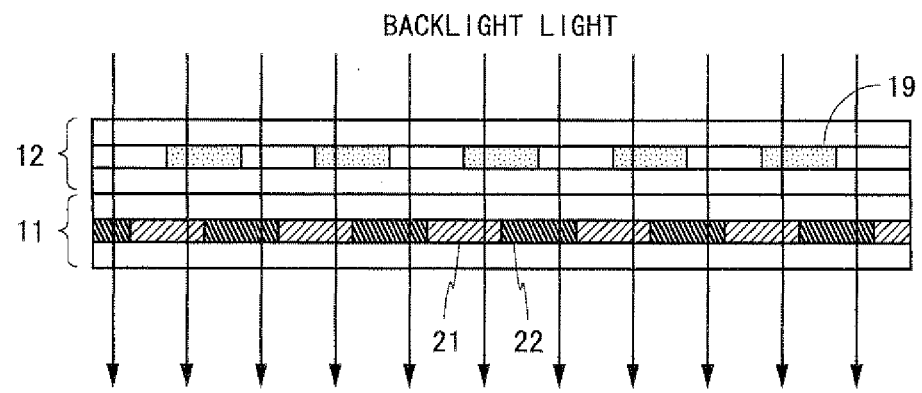
FIG. 4A is a diagram illustrating a principle of flat display in the liquid crystal display device shown in FIG. 1.
Figure 4B:
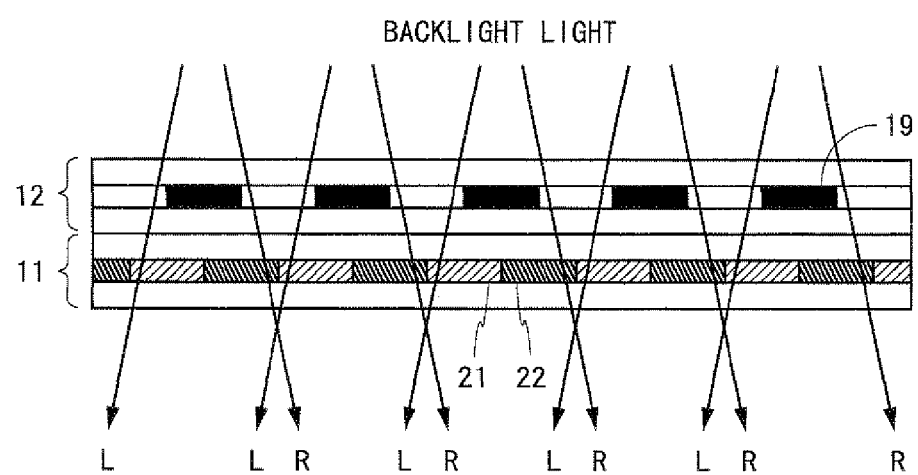
FIG. 4B is a diagram illustrating a principle of stereoscopic display in the liquid crystal display device shown in FIG. 1.

A method of switching between flat display and stereoscopic display in the liquid crystal display device 10 is described with reference to FIG. 4A and FIG. 4B. When performing flat display (FIG. 4A), the display control circuit 13 outputs the control signal CX at low-level to the parallax barrier liquid crystal panel 12. At this time, the shutter areas 19 of the parallax barrier liquid crystal panel 12 take the transparent state. As backlight light is transmitted through the shutter areas 19 in the transparent state, the same light reaches the left eye and the right eye of a person. At this time, the person recognizes a flat image.

When performing stereoscopic display (FIG. 4B), the display control circuit 13 outputs the control signal CX at high-level to the parallax barrier liquid crystal panel 12. At this time, the shutter areas 19 of the parallax barrier liquid crystal panel 12 take the nontransparent state, and function as a parallax barrier. As the backlight light is separated by the shutter areas 19 in the nontransparent state into two in the horizontal direction of the display screen. One of the divided light (represented by L in FIG. 4B) is transmitted through the pixel circuits for left eye 21 and reaches the left eye of the person. The other of the divided light (represented by R in FIG. 4B) is transmitted through the pixel circuits for right eye 22 and reaches the right eye of the person. When the image for left eye and the image for right eye that are suitable are displayed in the display liquid crystal panel 11 and the shutter areas 19 of the parallax barrier liquid crystal panel 12 is controlled to take the nontransparent state, the person recognizes a stereoscopic image.

Now, polarity inversion drive and video signal line time-division drive in the liquid crystal display device 10 are described. The liquid crystal display device 10 performs polarity inversion drive for changing a polarity of the voltage applied to liquid crystals (hereinafter simply referred to as a "voltage polarity"), as well as video signal line time-division drive in which the video signal lines are divided into groups of three lines. In this case, the liquid crystal display device 10 changes an order for writing a signal voltage to the pixel circuits 18 within one horizontal period (hereinafter simply referred to as "writing order"). In the following description, an order of R, G, and B is referred to as a "forward order", and an order of B, G, and R is referred to as a "reverse order".

Figure 5A:
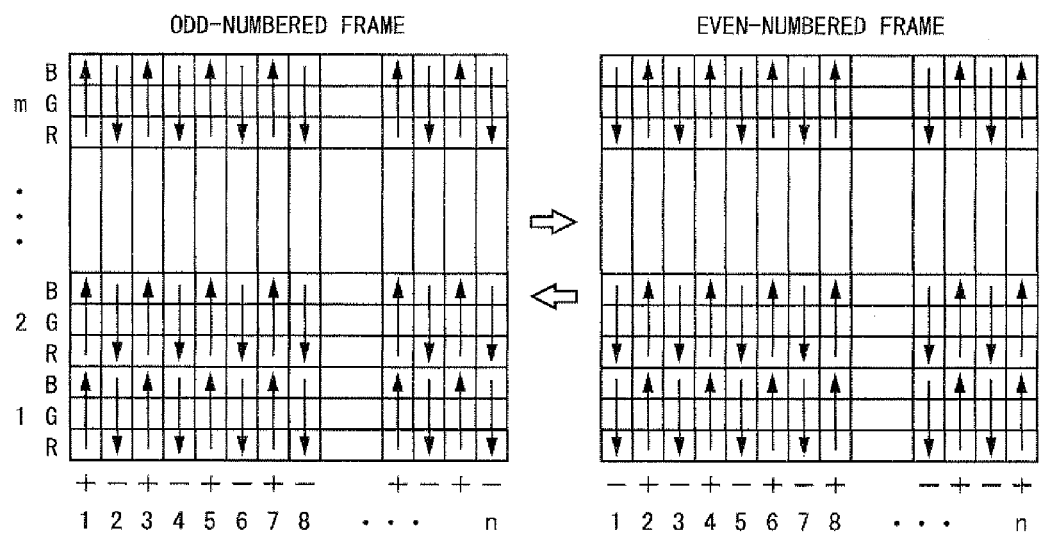
FIG. 5A is a diagram illustrating writing orders and voltage polarities in flat display in the liquid crystal display device shown in FIG. 1.

FIG. 5A is a diagram illustrating writing orders and voltage polarities in flat display. In flat display, the liquid crystal display device 10 changes the writing order and the voltage polarity every single scanning signal line. More specifically, in an odd-numbered frame, positive polarity voltages are written in the forward order to each pixel included in the odd-numbered column, and negative polarity voltages are written in the reverse order to each pixel included in the even-numbered column. In an even-numbered frame, negative polarity voltages are written in the reverse order to each pixel included in the odd-numbered column, and positive polarity voltages are written in the forward order to each pixel included in the even-numbered column.

Figure 5B:
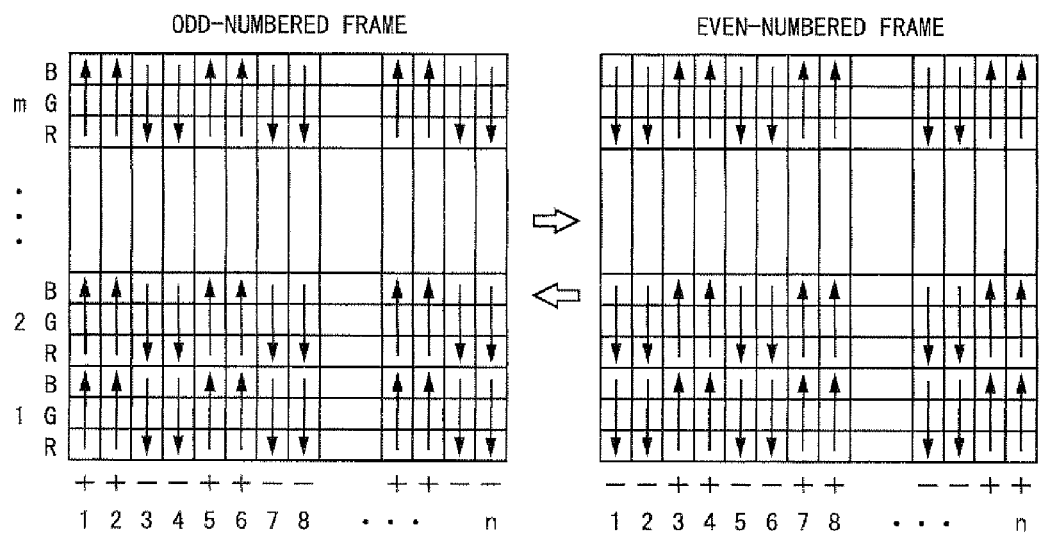
FIG. 5B is likewise a diagram illustrating writing orders and voltage polarities in stereoscopic display.

FIG. 5B is a diagram illustrating writing orders and voltage polarities in stereoscopic display. In stereoscopic display, the liquid crystal display device 10 changes the writing order and the voltage polarity every two scanning signal lines. More specifically, the pixels included in the pixel array 17 are classified into a first group including pixels for left eye arranged in a first column, a fifth column and so on, a second group including pixels for right eye arranged in a second column, a sixth column and so on, a third group including pixels for left eye arranged in a third column, a seventh column and so on, and a fourth group including pixels for right eye arranged in a fourth column, an eighth column and so on. In the odd-numbered frame, positive polarity voltages are written in the forward order to each pixel included in the first and the second group, and negative polarity voltages are written in the reverse order to each pixel included in the third and the fourth group. In the even-numbered frame, negative polarity voltages are written in the reverse order to each pixel included in the first and the second group, and positive polarity voltages are written in the forward order to each pixel included in the third and the fourth group. Summarization of the writing orders and the voltage polarities in stereoscopic display performed by the liquid crystal display device 10 is shown in FIG. 6.

Figure 7A:
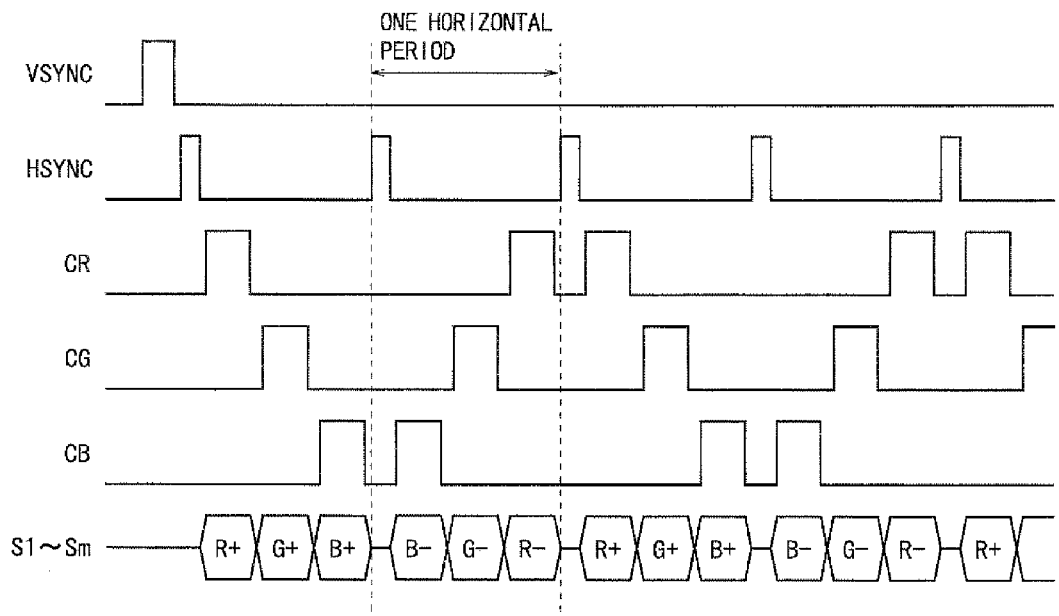
FIG. 7A is a timing chart in an odd-numbered frame in flat display in the liquid crystal display device shown in FIG. 1.

FIG. 7A is a timing chart in the odd-numbered frame in flat display. As shown in FIG. 7A, in a first period within a first horizontal period of the odd-numbered frame, the switch control signal CR becomes high-level, and the video signal line drive circuit 15 outputs signal voltages having positive polarity to be written to the R pixel circuits. In a second period that follows, the switch control signal CG becomes high-level, and the video signal line drive circuit 15 outputs signal voltages having positive polarity to be written to the G pixel circuits. In a third period that follows, the switch control signal CB becomes high-level, and the video signal line drive circuit 15 outputs signal voltages having positive polarity to be written to the B pixel circuits. Hereinafter, a mode of the change described above is referred to as a "first mode".

In a first period within a second horizontal period, the switch control signal CB becomes high-level, and the video signal line drive circuit 15 outputs signal voltages having negative polarity to be written to the B pixel circuits. In a second period that follows, the switch control signal CG becomes high-level, and the video signal line drive circuit 15 outputs signal voltages having negative polarity to be written to the G pixel circuits. In a third period that follows, the switch control signal CR becomes high-level, and the video signal line drive circuit 15 outputs signal voltages having negative polarity to be written to the R pixel circuits. Hereinafter, a mode of the change described above is referred to as a "second mode". Modes in a third horizontal period and after are the same as those in the first and the second horizontal period.

Figure 7B:
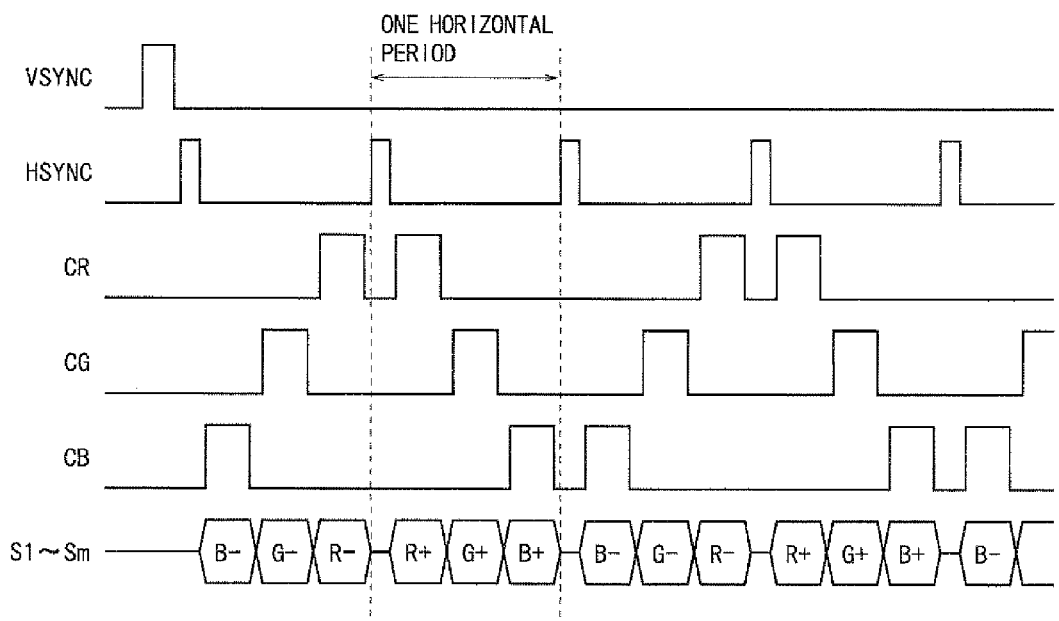
FIG. 7B is likewise a timing chart in an even-numbered frame in flat display.

FIG. 7B is a timing chart in the even-numbered frame in flat display. As shown in FIG. 7B, the switch control signals CR, CG, and CB and the outputs from the video signal line drive circuit 15 change based on the second mode in the first horizontal period of the even-numbered frame, and change based on the first mode in the second horizontal period of the even-numbered frame. The modes of the change in the third horizontal period and after are the same as those in the first and the second horizontal period.

Figure 8A:
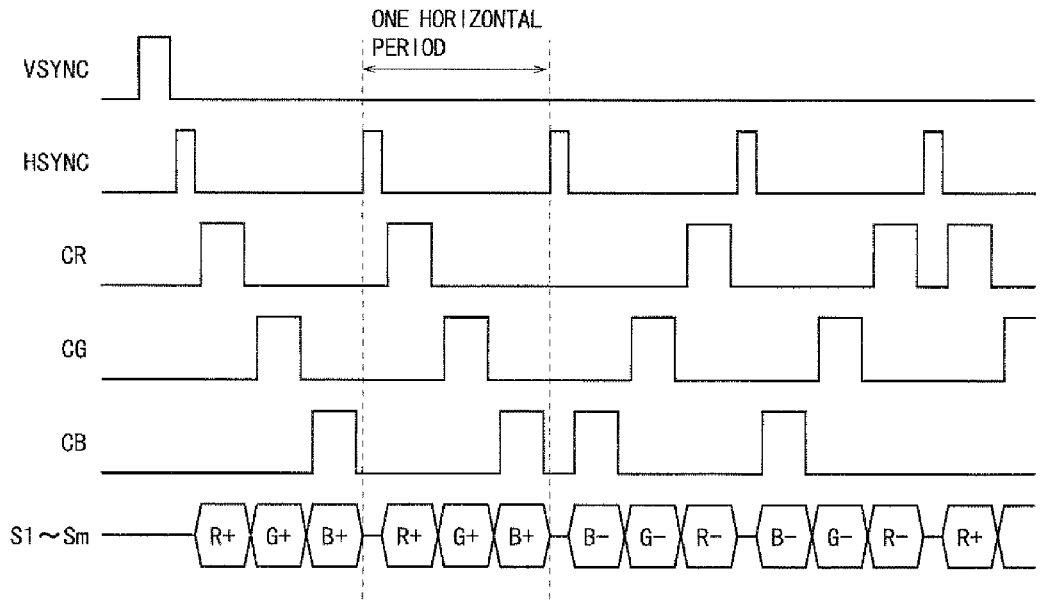
FIG. 8A is likewise a timing chart in an odd-numbered frame in stereoscopic display.

FIG. 5A is a timing chart in the odd-numbered frame in stereoscopic display. As shown in FIG. 8A, the switch control signals CR, CG, and CB and the outputs from the video signal line drive circuit 15 change based on the first mode in the first and the second horizontal period of the odd-numbered frame, and change based on the second mode in the third and the fourth horizontal period of the odd-numbered frame. The modes of the change in a fifth horizontal period and after are the same as those in the first to fourth horizontal periods.

Figure 8B:
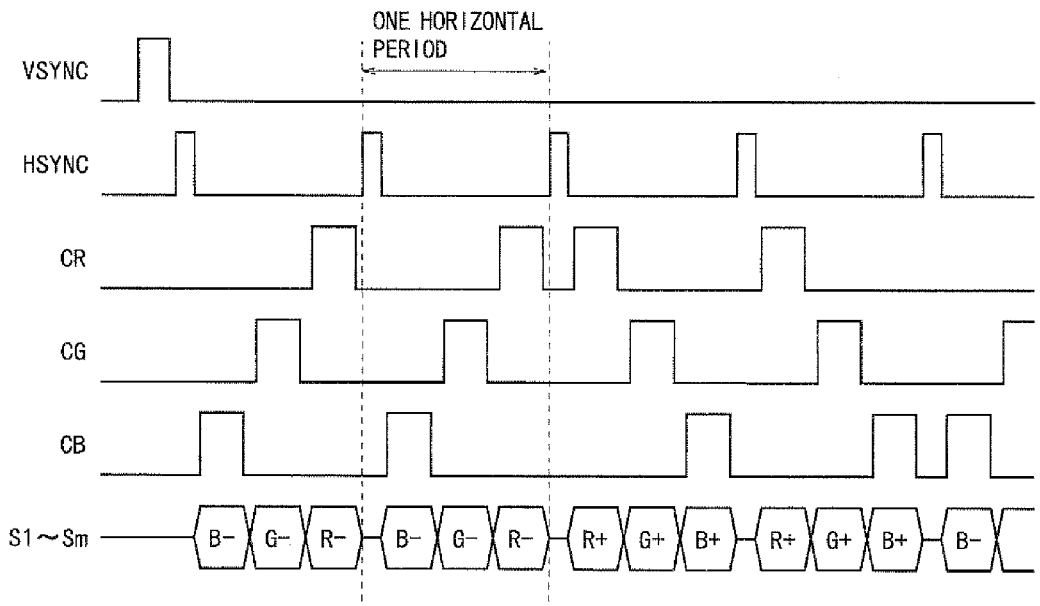
FIG. 8B is likewise a timing chart in an even-numbered frame in stereoscopic display.

FIG. 8B is a timing chart in the even-numbered frame in stereoscopic display. As shown in FIG. 8B, the switch control signals CR, CG, and CB and the outputs from the video signal line drive circuit 15 change based on the second mode in the first and the second horizontal period of the even-numbered frame, and change based on the first mode in the third and the fourth horizontal period of the even-numbered frame. The modes of the change in the fifth horizontal period and after are the same as those in the first to fourth horizontal periods.

Now, effects of the liquid crystal display device 10 according to this embodiment are described. There is a parasitic capacitance between video signal lines and pixel circuits in a liquid crystal display device, and therefore applying a signal voltage to the video signal lines often causes variation in a potential held in the pixel circuits. In a case of a liquid crystal display device that performs video signal line time-division drive, an amount of variation in the potential depends on the writing order. Therefore, when the writing order is fixed in the liquid crystal display device that performs video signal line time-division drive, a cyclic noise occurs in the potential held in the pixel circuits according to the writing order, resulting in a display unevenness in a stripe pattern. Such a display unevenness occurring in a color liquid crystal display device is recognized as a color registration error (color shift) to a person.

As one method of preventing such a color registration error, changing the writing order every frame is considered. However, according to this method, the amount of variation in the potential changes every frame, and flickers occur in a displayed image. Therefore, as one method of preventing such flickers, changing the writing order every single scanning signal line is considered (see FIG. 5A). In flat display, it is possible to prevent the color registration error and the flickers using this method.

However, this method is not suited for stereoscopic display. Focusing on the pixels for left eye in stereoscopic display, this method merely changes the writing order every frame for the pixels for left eye. This also applies to the pixels for right eye. Accordingly, in stereoscopic display, even if the writing order is changed every single scanning signal line, flickers occur in both of the image for left eye and the image for right eye. Such flickers become more noticeable in a case in which the image for left eye is a black image and the image for right eye is a monochromatic halftone image in a color other than black, for example.

The liquid crystal display device 10 according to this embodiment changes the writing order every two scanning signal lines in stereoscopic display (see FIG. 5B). Therefore, it is possible to change the writing order every single line for the pixels for left eye, as well as every single line for the pixels for right eye. Further, the liquid crystal display device 10 according to this embodiment changes the voltage polarity every two scanning signal lines in stereoscopic display. Therefore, it is possible to change the voltage polarity every single line for the pixels for left eye, as well as every single line for the pixels for right eye. Accordingly, it is possible to prevent color registration errors and flickers from occurring both in the image for left eye and the image for right eye.

It should be noted that, it is possible to consider a method of changing the writing order every two scanning signal lines while changing the voltage polarity every single scanning signal line, as shown in FIG. 9. According to this method, nothing but frame inversion drive is performed to the pixels for left eye and the pixels for right eye. Further, for the pixels for left eye in the first group, the signal voltage is written based on one of combinations of (forward order, positive polarity) and (reverse order, negative polarity), and for the pixels for left eye in the third group, the signal voltage is written based on one of combinations of (reverse order, positive polarity) and (forward order, negative polarity). As described above, as pixels based on different combinations of the writing order and the voltage polarity are included in the same type of pixels, a display unevenness easily occurs.

By contrast, according to the liquid crystal display device 10 of this embodiment, the signal voltage is written based on one of the combinations of (forward order, positive polarity)

and (reverse order, negative polarity) for all the pixels including the pixels for left eye and the pixels for right eye. As described above, it is possible to prevent a display unevenness from occurring by using the same combination of the writing order and the voltage polarity for all the pixels.

Further, in flat display, the liquid crystal display device 10 according to this embodiment changes the writing order and the voltage polarity every single scanning signal line. Therefore, it is possible to improve image quality both in stereoscopic display and in flat display.

Second Embodiment

A liquid crystal display device according to a second embodiment of the present invention has the same configuration as the liquid crystal display device according to the first embodiment (see FIG. 1). The liquid crystal display device according to this embodiment is different from the liquid crystal display device according to the first embodiment only in that the writing orders and the voltage polarities in stereoscopic display. The following describes the difference from the first embodiment.

Figure 10:
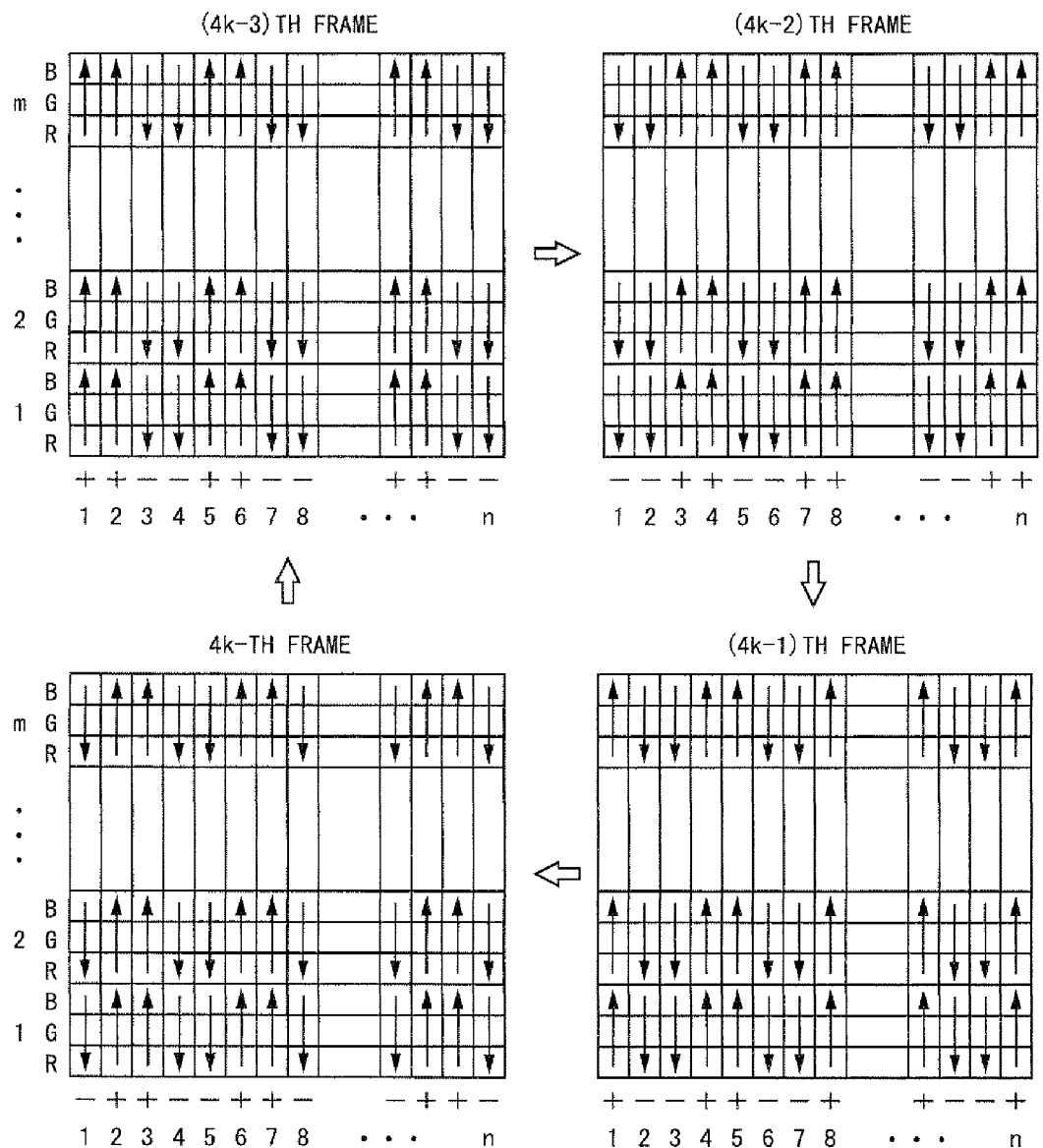
FIG. 10 is a diagram illustrating writing orders and voltage polarities in stereoscopic display in a liquid crystal display device according to a second embodiment of the present invention.
Figure 11:
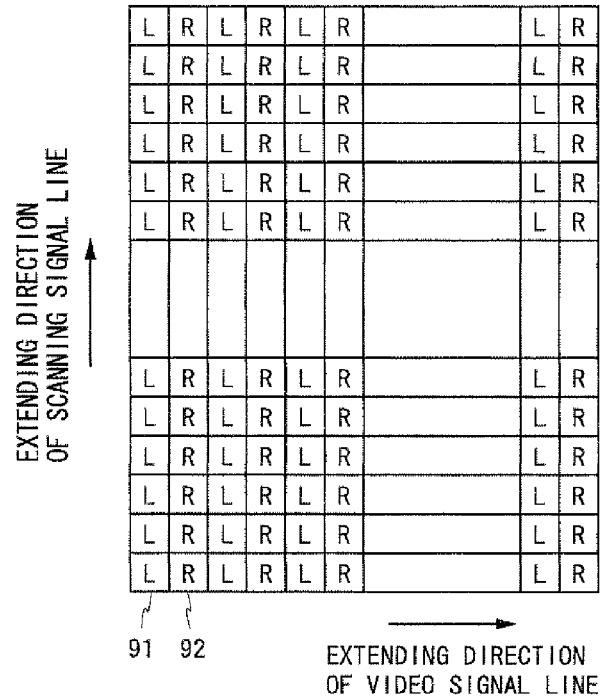
FIG. 11 is a diagram illustrating a pixel arrangement of a stereoscopic display device.
Figure 12:
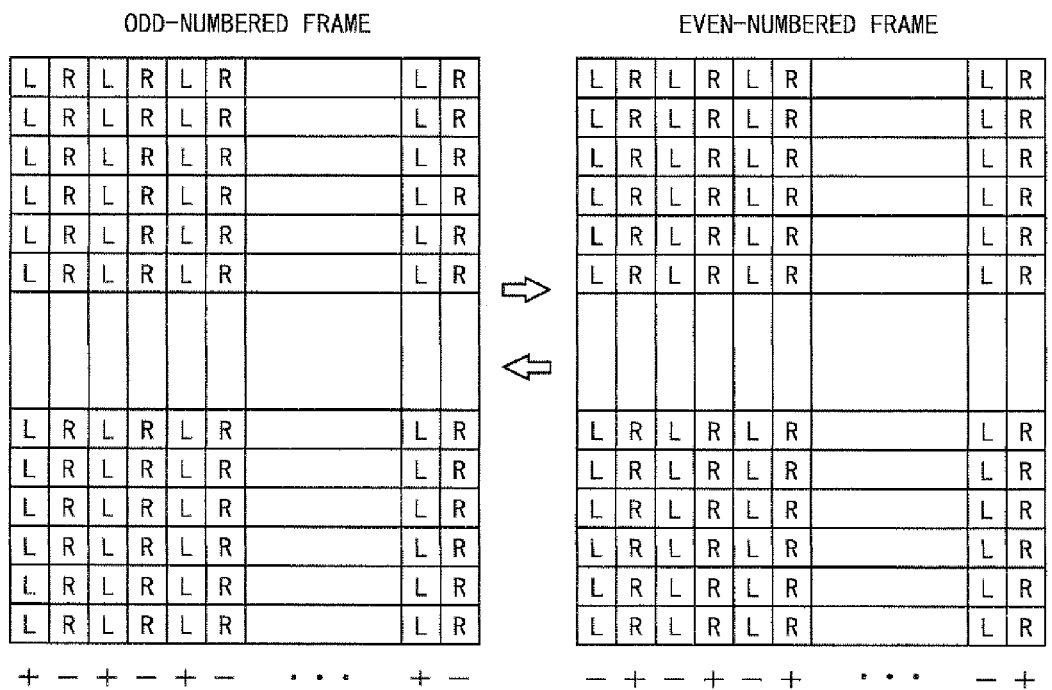
FIG. 12 is a diagram illustrating voltage polarities when single line inversion drive is performed in the pixel arrangement shown in FIG. 11.

Similarly to the liquid crystal display device according to the first embodiment, the liquid crystal display device according to this embodiment changes the writing order and the voltage polarity every single horizontal period in flat display, and changes the writing order and the voltage polarity every two horizontal periods in stereoscopic display. FIG. 10 is a diagram illustrating the writing orders and the voltage polarities in stereoscopic display in the liquid crystal display device according to this embodiment. Hereinafter, k is assumed to be an integer not smaller than 1.

As shown in FIG. 10, in a (4 k−3)th frame, positive polarity voltages are written in the forward order to each pixel included in the first and the second group, and negative polarity voltages are written in the reverse order to each pixel included in the third and the fourth group. In (4 k−2) th frame, negative polarity voltages are written in the reverse order to each pixel included in the first and the second group, and positive polarity voltages are written in the forward order to each pixel included in the third and the fourth group. In (4 k−1) th frame, positive polarity voltages are written in the forward order to each pixel included in the first and the fourth group, and negative polarity voltages are written in the reverse order to the pixels included in the second and the third group. In 4 k-th frame, negative polarity voltages are written in the reverse order to each pixel included in the first and the fourth group, and positive polarity voltages are written in the forward order to each pixel included in the second and the third group.

As described above, in the liquid crystal display device of this embodiment, the voltage polarity is changed every two scanning signal lines. Further, the voltage polarity is changed every four scanning signal lines that are arranged next to each other in each frame in four different manners: (positive, positive, negative, negative), (negative, negative, positive, positive), (positive, negative, negative, positive), and (negative, positive, positive, negative). Therefore, for all the video signal lines, a probability that a signal voltage of the same polarity is written next and a probability that a signal voltage of a different polarity is written next become the same. With this, it is possible to suppress a luminance difference between the image for left eye and the image for right eye.

It should be noted that while, in the above description, the mode selection signal MD for switching between flat display and stereoscopic display is externally supplied to the liquid crystal display, it is possible to superpose data for switching between flat display and stereoscopic display over an existing signal (a blanking period section in the video signal VS, for example). Further, according to the liquid crystal display device of the present invention, it is possible to change the writing order every multiples of two scanning signal lines in stereoscopic display.

As described above, according to the stereoscopic display device of the present invention, by driving using the writing order and the voltage polarity suitable for stereoscopic display, it is possible to improve image quality of both the image for left eye and the image for right eye, thereby improving image quality in stereoscopic display.

INDUSTRIAL APPLICABILITY

The stereoscopic display device according to the present invention is advantageously capable of driving in a manner suitable for stereoscopic display and displaying an image with high image quality, and thus, can be utilized in various electronic devices having a function of stereoscopic display, such as stereoscopic display television.

DESCRIPTION OF REFERENCE CHARACTERS

10: Liquid Crystal Display Device
11: Display Liquid Crystal Panel
12: Parallax Barrier Liquid Crystal Panel
13: Display Control Circuit
14: Scanning Signal Line Drive Circuit
15: Video Signal Line Drive Circuit
16: Analog Switch.
17: Pixel Array
18: Pixel Circuit
19: Shutter Area
21: Pixel. Circuit for Left Eye
22: Pixel Circuit for Right Eye

The invention claimed is:
1. A stereoscopic display device having a function of displaying an image in a stereoscopic manner in a display screen having a horizontal direction and a vertical direction, the stereoscopic display device comprising:
a plurality of scanning signal lines that extend along the vertical direction of the display screen;
a plurality of video signal lines that extend along the horizontal direction of the display screen, and are classified, according to an arrangement order, into groups each including a first number of video signal lines;
a pixel array that includes a plurality of pixel circuits arranged corresponding to intersections between the scanning signal lines and the video signal lines;
a scanning signal line drive circuit configured to select the scanning signal lines;
a video signal line drive circuit configured to divide one horizontal period into a second number of periods, the second number being equal to the first number, and output, to each group of the video signal lines, a voltage to be applied to the video signal lines in the group in a time-division manner within one horizontal period; and
a video signal line selection circuit including a plurality of analog switches positioned away from the pixel array, each corresponding to the video signal line, and configured to, by controlling the switches, select one of the video signal lines, based on switch control signals, in each group, and supply the voltage outputted from the video signal line drive circuit to the selected video signal line, wherein the pixel array is configured such that columns each having pixel circuits for left eye arranged along the vertical direction of the display screen and columns each having pixel circuits for right eye arranged along the vertical direction of the display screen are alternately arranged along the horizontal direction of the display screen, and an order of writing to the pixel circuits corresponding to the same scanning signal line within one horizontal period, the order being determined by controlling the switches, is changed every two scanning lines.

2. The stereoscopic display device according to claim 1, wherein when an image is displayed in a flat manner, the order of writing is changed every single scanning signal line.

3. The stereoscopic display device according to claim 1, wherein a polarity of a voltage to be written to the pixel circuits is changed every two scanning signal lines.

4. The stereoscopic display device according to claim 3, wherein the polarities of the voltages applied to four scanning signal lines that are arranged next to each other are changed in four different manners within four frame periods.

5. The stereoscopic display device according to claim 3, wherein when an image is displayed in a flat manner, the polarity of the voltage is changed every single scanning signal line.

6. A method of driving a stereoscopic display device having a function of displaying an image in a stereoscopic manner in a display screen having a horizontal direction and a vertical direction, and including: a plurality of scanning signal lines that extend along the vertical direction of the display screen; a plurality of video signal lines that extend along the horizontal direction of the display screen, and are classified, according to an arrangement order, into groups each including a first number of video signal lines; and a pixel array that includes a plurality of pixel circuits arranged corresponding to intersections between the scanning signal lines and the video signal lines, the method comprising the steps of:

selecting the scanning signal lines;

dividing one horizontal period into a second number of periods, the second number being equal to the first number;

outputting, to each group of the video signal lines, a voltage to be applied to the video signal lines in the group in a time-division manner within one horizontal period; and by controlling a plurality of analog switches positioned away from the pixel array, each corresponding to the video signal line, selecting one of the video signal lines, based on switch control signals, in each group, and supplying the voltage outputted in a time-division manner to the selected video signal line, wherein the pixel array is configured such that columns each including pixel circuits for left eye arranged along the vertical direction of the display screen and columns each including pixel circuits for right eye arranged along the vertical direction of the display screen are alternately arranged along the horizontal direction of the display screen, and an order of writing to the pixel circuits corresponding to the same scanning signal line within one horizontal period, the order being determined by controlling the switches, is changed every two scanning signal lines.

\* \* \* \* \*